United States Patent
Mitlin et al.

(10) Patent No.: US 11,498,587 B1
(45) Date of Patent: Nov. 15, 2022

(54) AUTONOMOUS MACHINE MOTION PLANNING IN A DYNAMIC ENVIRONMENT

(71) Applicant: Amazon Technologies, Inc., Seattle, WA (US)

(72) Inventors: Anatoly Mitlin, Swampscott, MA (US); Samer Nashed, Amherst, MA (US)

(73) Assignee: Amazon Technologies, Inc., Seattle, WA (US)

( * ) Notice: Subject to any disclaimer, the term of this patent is extended or adjusted under 35 U.S.C. 154(b) by 14 days.

(21) Appl. No.: 16/751,675

(22) Filed: Jan. 24, 2020

Related U.S. Application Data (60) Provisional application No. 62/797,016, filed on Jan. 25, 2019.

(51) Int. Cl.
| | |
|---|---|
| *G05D 1/00* | (2006.01) |
| *G05D 1/02* | (2020.01) |
| *G01C 21/34* | (2006.01) |
| *B60W 60/00* | (2020.01) |

(52) U.S. Cl.
CPC .... *B60W 60/0027* (2020.02); *B60W 60/0015* (2020.02); *G05D 1/0088* (2013.01); *G05D 1/0212* (2013.01); *B60W 2554/4041* (2020.02); *B60W 2554/4042* (2020.02); *B60W 2554/4043* (2020.02); *G01C 21/34* (2013.01)

(58) Field of Classification Search
CPC ....................................................... G01C 21/34
See application file for complete search history.

(56) References Cited

U.S. PATENT DOCUMENTS

| | | | |
|---|---|---|---|
| 6,917,855 B2 * | 7/2005 | Gonzalez-Banos | ........................ G05D 1/0094 700/245 |
| 7,211,980 B1 * | 5/2007 | Bruemmer | ........... G05D 1/0274 318/587 |
| 7,620,477 B2 * | 11/2009 | Bruemmer | ............. G06N 3/008 180/167 |
| 10,882,522 B2 * | 1/2021 | Rosman | ................. G06N 3/088 |

(Continued)

FOREIGN PATENT DOCUMENTS

| | | | | |
|---|---|---|---|---|
| AT | 519547 | * | 8/2018 | ............ B60W 10/04 |
| JP | H0772925 A | * | 9/1993 | |

(Continued)

OTHER PUBLICATIONS

Choi et al, "Learning and Predicting Moving Object Trajectory: a piecewise trajectory segment approach", Aug. 2006, Carnegie Mellon University Robotics Institute (Year: 2006).*

*Primary Examiner* — Peter D Nolan
*Assistant Examiner* — Kenneth M Dunne
(74) *Attorney, Agent, or Firm* — Lowenstein Sandler LLP (57) ABSTRACT

An autonomous robot system to enable automated movement of goods and materials in a dynamic environment including one or more dynamic objects. The autonomous robot system includes an autonomous ground vehicle (AGV) including a vehicle management system. The vehicle management system provides real time resource planning and path optimization to enable the AGV to operate safely and efficiently alongside humans in a dynamic environment. The vehicle management system includes one or more processing devices to execute a moving object trajectory prediction module to predict a trajectory of a dynamic or moving object in a shared environment.

20 Claims, 5 Drawing Sheets

(56) References Cited

U.S. PATENT DOCUMENTS

| | | | | |
|---|---|---|---|---|
| 2007/0107966 | A1* | 5/2007 | Brunner | G01S 17/42 180/167 |
| 2008/0009967 | A1* | 1/2008 | Bruemmer | G05D 1/0088 700/245 |
| 2011/0231016 | A1* | 9/2011 | Goulding | G05D 1/0088 901/1 |
| 2013/0253815 | A1* | 9/2013 | Orfila | B60W 30/0956 701/301 |
| 2014/0114526 | A1* | 4/2014 | Erb | B66F 17/003 701/28 |
| 2018/0074505 | A1* | 3/2018 | Lv | G05D 1/0289 |
| 2018/0181104 | A1* | 6/2018 | Stubbs | G05D 1/0214 |
| 2019/0369616 | A1* | 12/2019 | Ostafew | G08G 1/0133 |
| 2019/0391580 | A1* | 12/2019 | Di Cairano | G06N 5/022 |
| 2020/0148201 | A1* | 5/2020 | King | G06N 7/005 |
| 2021/0309264 | A1* | 10/2021 | Felip Leon | B25J 9/1666 |
| 2021/0316762 | A1* | 10/2021 | Kum | G06N 3/0454 |

FOREIGN PATENT DOCUMENTS

| | | | | |
|---|---|---|---|---|
| JP | 2008152600 A | * | 7/2008 | |
| JP | 2011224679 A | * | 11/2011 | |
| JP | 2012236244 A | * | 12/2012 | B25J 9/1666 |
| WO | WO-2009063318 A1 | * | 5/2009 | B25J 9/162 |
| WO | WO2017217265 | * | 12/2017 | B60W 30/0953 |

* cited by examiner

Fig 5

AUTONOMOUS MACHINE MOTION PLANNING IN A DYNAMIC ENVIRONMENT

CROSS-REFERENCE TO RELATED APPLICATION

This application claims the benefit of U.S. Provisional Application No. 62/797,016, titled "Autonomous Machine Motion Planning in a Dynamic Environment," filed Jan. 25, 2019, the entire disclosure of which is incorporated herein by reference.

BACKGROUND

Autonomous machines or autonomous robots can operate in an environment to perform certain tasks, including the conveying of materials from one point to another. The autonomous machines are configured to behave based on information associated with the environment, such as, for example, using autonomous navigation to plan and execute a path of travel without human intervention. Conventionally, autonomous navigation robots are employed in static environments having objects with fixed or known locations that can be considered in setting a motion plan and detected by the robot during navigation. Furthermore, conventional autonomous navigation robots include safety mechanisms that force the robotic vehicle to stop its motion in the presence of an unexpected moving object.

BRIEF DESCRIPTION OF DRAWINGS

The present disclosure will be understood more fully from the detailed description given below and from the accompanying drawings of various embodiments, which, however, should not be taken to limit the present disclosure to the specific embodiments, but are for explanation and understanding only.

DETAILED DESCRIPTION

An autonomous robot system that enables flexible, safe, efficient, and automated movement of goods and materials in a dynamic environment including one or more dynamic objects (e.g., humans). The autonomous robot system includes one or more deliver containers and an autonomous ground vehicle (AGV) including a vehicle management system. The vehicle management system provides real time resource planning and path optimization to enable the AGV to operate safely and efficiently alongside humans in a dynamic environment (e.g., a warehouse or fulfillment facility). The vehicle management system includes one or more processing devices to execute a moving object trajectory prediction module to predict a trajectory of a dynamic or moving object (e.g., a human) in a shared environment.

The vehicle management system can use localization and mapping information associated with the AGV and a predicted trajectory of a dynamic object to establish a path and trajectory for the AGV that enables real-time dynamic obstacle sensing and avoidance. The vehicle management system interprets the current environment including detected dynamic objects and determines updated or adjusted trajectory data to provide to a motion controller for generating drive instructions for execution by a drive system of the AGV. Advantageously, the AGV is configured to perform tasks in a collaborative environment while moving safely alongside humans in a highly dynamic workspace.

The embodiments described herein relate to robotic vehicles that move autonomously along the ground (herein referred to as an "autonomous robotic vehicle"). Although the various embodiments are directed to unmanned robots that are autonomous ground vehicles that autonomously move along the ground, other embodiments may be incorporated in other vehicles that travel in air, in space, in water, or the like, where direct-perception navigation is possible. The autonomous robotic ground vehicles described herein are "unmanned," in that no humans are on board this ground vehicle. According to embodiments, the autonomous robotic vehicle includes a vehicle management system that uses sensors and computational resources to safely travel along the ground in an environment including dynamic obstacles or objects (e.g., humans).

In contrast, conventional autonomous robots are limited to use in environments having only static or quasi-static objects. Due to safety concerns, conventional autonomous robots are not deployed in an environment including humans. Instead, in those environments (e.g., a fulfillment facility), movement of goods and materials (e.g., inventory) is performed by humans, human-operated vehicles, and conveyors.

As described above, the embodiments described herein overcome the problems and challenges set forth above with respect to detecting a dynamic object and performing motion planning for the autonomous robotic vehicle in view of a predicted trajectory of the detected object. The embodiments of the autonomous robotic vehicle include a vehicle management system with obstacle sense and avoid capabilities to re-plan the motion of the autonomous robotic vehicle through complex environments while maintaining assured safety around people. The vehicle management system enables an autonomous shift between slow and cautious behavior in highly dynamic and crowded areas to fast and efficient behavior in open spaces where higher speeds are safe. The vehicle management system uses vehicle behavior and signaling to convey vehicle intentions and inspire confidence from the nearby human bystanders and operators, to enable close operation and collaboration with humans.

The autonomous robotic vehicle uses sensor data collected by one or more sensors to generate an interpretation of a surrounding environment. The environment interpretation includes localization and mapping of the autonomous robotic vehicle to generate map data and vehicle pose estimation data (collectively referred to as the "autonomous robotic vehicle location data"). The environment interpretation also includes object recognition and tracking to generate detected object data. The detected object data is analyzed to determine predicted trajectory data corresponding to the detected dynamic object. The autonomous robotic vehicle location data and the predicted trajectory data are analyzed by a path and trajectory planning module to generate trajectory data for the autonomous robotic vehicle and enable object avoidance. As a result, the embodiments of the autonomous robotic vehicle and vehicle management system described herein can navigate in an environment including dynamically moving objects in a safe, efficient, and reliable manner. Thus, aspects of the embodiments described herein can overcome the problems and deficiencies of conventional autonomous robotic vehicles that prohibit and forcibly interrupt motion of the robotic vehicle in response to detection of a moving object.

The various embodiments described below are directed to a type of autonomous robotic vehicle for traveling on the ground, namely a direct-perception AGV. The embodiments of the direct-perception AGV provide a solution that can be employed in an uncertainty environment including one or more unknown dynamic obstacles. The autonomous robotic vehicle can predict the motion of a dynamic object. In an embodiment, the predicted motion can represent a change in position of an object (e.g., a human) over time, and can be characterized by parameters such as trajectory, pose, displacement, distance, velocity, acceleration, time, and speed.

Figure 1:
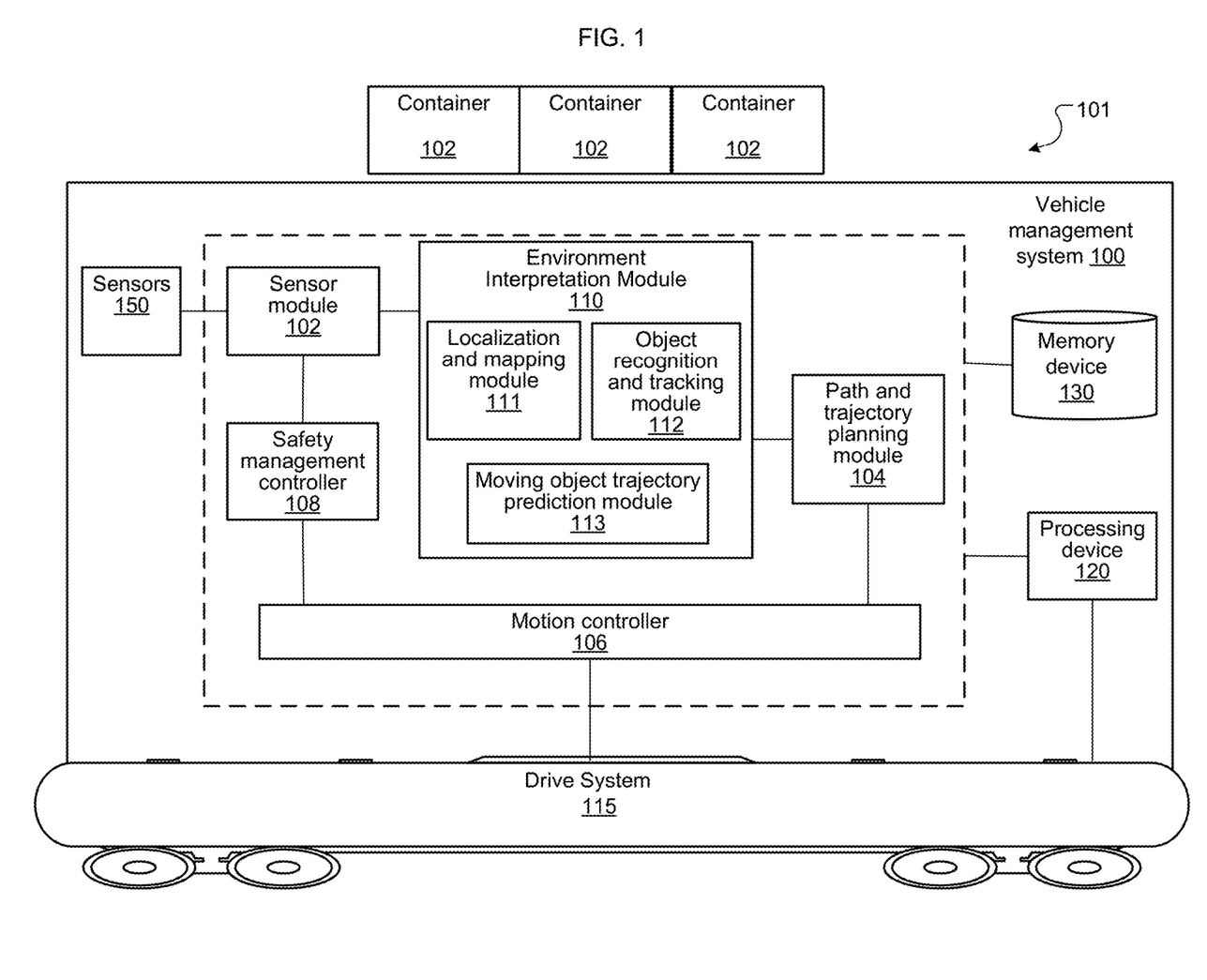
FIG. 1 is a block diagram of an autonomous robotic vehicle including a vehicle management system to enable navigation in a dynamic environment, according to one embodiment.

FIG. 1 is a block diagram of a vehicle management system 100 to manage operation and motion of an autonomous robotic vehicle in an environment including one or more dynamic objects (e.g., humans), according to one embodiment. The vehicle management system 100 is employed on an autonomous robotic vehicle such as an autonomous ground vehicle (AGV) 101 including one or more delivery containers 102. The AGV 101 can include one or more memory devices 130, a drive system 115 of one or more actuators, and one or more processing device 110 coupled to the one or more memory devices 130 and the drive system 115. According to embodiments, the AGV 101 can include additional components, such as data storage, a Global Positioning System (GPS) unit, radios, antennas, or the like. The radios may include cellular radios, wireless local area network (WLAN) radios, personal area network (PAN) radios, or the like.

The AGV 101 includes one or more sensors 150 configured to detect, capture, and collect data associated with an environment of the AGV 101. The sensors 114 may include one or more cameras of one or more types, accelerometers, inertial sensors, temperature sensors, proximity sensors, infrared sensors, pressure sensors, light sensors, ultrasonic sensors, humidity sensors, wheel encoders, imaging/scanning light detection and ranging (LIDAR) sensor, an RGB-D sensor, one dimensional ranging sensors such as a laser/light emitting diode (LED) time-of-flight sensor/ranger, an ultrasonic sensor/ranger, a reflectivity intensity sensor/ranger, or a set of sensors configured to act as a triangulation sensor/ranger; two dimensional image capturing sensors or cameras including visible light cameras and/or infrared/thermal cameras; two dimensional ranging sensors such as a scanning or other suitable light pulse laser ranging sensors; and/or three dimensional imagers such as the LIDAR sensor, a solid-state LIDAR, a time-of-flight camera(s), stereo cameras both active and passive, structured light cameras, or radio detection and ranging (Radar) transmitters and receivers.

The one or more motorized actuators of the drive system 115 can include motors to drive wheels, tread systems, or other mechanisms to provide linear and rotational movements of the AGV 101. It should be noted that although one processing device 120 is illustrated, in other embodiments, multiple processing devices can be used. In other embodiments, the processing device 120 includes multiple execution threads that can perform the various operations described herein. In one system, an AGV 101 can include actuators, one or more memory devices, and one or more processing devices, where at least one of the processing devices is located on the AGV 101.

In one embodiment, the memory device 130 stores instructions of a sensor module 102, a path an trajectory planning module 104, a motion controller 106, a safety management controller 108, and an environment interpretation module 110 for managing the motion of the AGV 101 in an environment including one or more dynamically-moving objects (e.g., humans). Additional details of the sensor module 102, the path and trajectory planning module 104, the motion controller 106, the safety management controller 108, and the environment interpretation module 110 are described in more detail below.

During operation, the processing device 120 executes the sensor module 102, the path and trajectory planning module 104, the motion controller 106, the safety management controller 108, and the environment interpretation module 110. In an embodiment, the one or more sensors 150 capture data relating to the environment (e.g., surroundings including static, quasi-static, and dynamic objects) of the AGV 101. The sensors 150 provide the sensor data to sensor module 102 of the vehicle management system 100. The sensor module 102 processes the raw sensor data corresponding to the AGV 101 and environment and provides the sensor data to the environment interpretation module 110.

According to embodiments, the environment interpretation module 110 includes a localization and mapping module 111, an object recognition and tracking module 112, and a moving object trajectory prediction module 113. In an embodiment, the localization and mapping module 111 receives the sensor data and combines the sensor data with historical data associated with the environment, the AGV 101, one or more known objects, etc. In an embodiment, the localization and mapping module 111 analyzes the sensor data and the historical data to determine a location of the AGV 101 (i.e., localization). In an embodiment, the localization and mapping module 111 further generate a map of the environment. In an embodiment, the localization and mapping module 111 perform simultaneous localization and mapping (also referred to as "SLAM").

In an embodiment, the object recognition and tracking module 112 of the environment interpretation module 110 detects one or more obstacles within the environment and tracks the detected obstacles (e.g., objects) over time. In an embodiment, the moving object trajectory prediction module 113 of the environment interpretation module 110 identifies one or more moving objects from the detected obstacles and generates a predicted (e.g., future) trajectory of the moving objects. In an embodiment, the moving object trajectory prediction module 113 generates a set of information including the AGV 101 information (e.g., the localization and mapping information) and the moving object trajectory prediction information (collectively referred to as "environment information").

In an embodiment, the path and trajectory planning module 104 processes the environment information to plan a high-level path to accomplish a current task assigned to the AGV 101 (e.g., "move from point A to point B") and generate a trajectory of desired positions and times that the AGV 101 can follow to move along the planned path (herein referred to as "trajectory information"). In an embodiment, the path and trajectory planning module 104 provides the trajectory information associated with the AGV 101 to the motion controller 106. The motion controller 106 converts the trajectory information into one or more drive commands or instructions (e.g., velocity commands) to be provided to the drive system 115.

In an embodiment, the vehicle management system 100 includes a safety management controller 108 configured to receive the sensor data from the sensor module 102 and apply one or more safety protocols to ensure the AGV 101 does not collide with any detected objects. In one embodiment, the safety management controller 108 can generate, based on the sensor data, instructions to stop the AGV 101 and provide the instructions to the motion controller 106. In an embodiment, the instructions to stop the AGV 101 (also referred to as "safety stop" instructions) can be provided to the drive system 115 for execution to avoid a potential collision with an object detected based on the sensor data.

Figure 2:
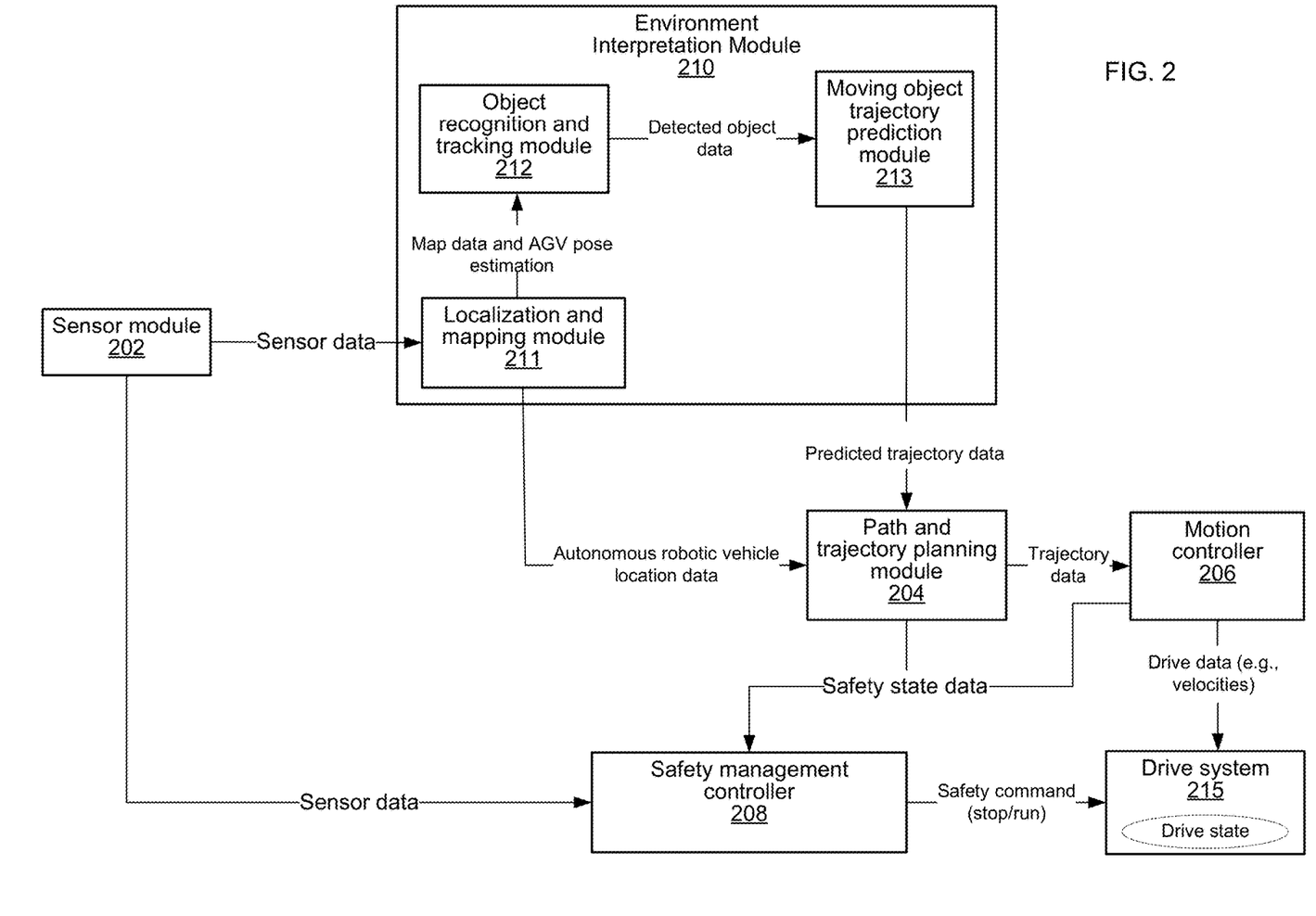
FIG. 2 is a block diagram illustrating a vehicle management system including onboard software components and corresponding data flows, according to one embodiment.

FIG. 2 illustrates a diagram including a vehicle management system 200 and corresponding data flow resulting from the operation thereof. As shown in FIG. 2, the vehicle management system 200 can include a sensor module 202, an environment interpretation module 210, a path and trajectory planning module 204, a motion controller 206 and a safety management controller 208. In an embodiment, the sensor module 202 receives and processes sensor data collected and captured by one or more sensors of an AGV. The sensor module 202 can provide the sensor data to the environment interpretation module 210 and the safety management controller 208.

In an embodiment, if the sensor data indicates a potential threat (e.g., an impending collision with an object) to the AGV, the safety management controller 208 can generate a safety stop instruction and send the safety stop instruction to the motion controller 206. In an embodiment, the safety management controller 208 assesses a threat level associated with the environment of the AGV and potential collisions and sends a corresponding safety command (e.g., a stop or run command) to the drive system 215 of the AGV.

In an embodiment, the environment interpretation module 210 uses the sensor data to generate environment information (e.g., information relating to the localization and mapping of the AGV, information relating to one or more detected objects including a predicted trajectory of one or more dynamic objects, etc.).

In an embodiment, the environment interpretation module 210 includes a localization and mapping module 211, an object recognition and tracking module 212, and a moving object trajectory prediction module 213. The localization and mapping module 211 performs localization and mapping by determining a vehicle state associated with the AGV (e.g., position, orientation, velocity, etc.) within a global frame and map associated with the environment by combining or fusing multiple sensor measurements. In an embodiment, the localization and mapping module 211 builds and refines the global environmental map based on historical and newly collected sensor measurements.

In an embodiment, the localization and mapping module 211 iteratively predicts and evaluates possible trajectories the host AGV can take in a given environment. The localization and mapping module 211 maximizes the expected progress of the AGV while respecting the speed and smoothness preference of the user and minimizing the expected cost of collision.

The object recognition and tracking module 212 performs operations to relating to object detection, tracking, classification, and prediction. In an embodiment, the object recognition and tracking module 212 detects obstacles and classifies the detected objects into categories. For example, if a human passes the AGV, the object recognition and tracking module 212 can mark the human with a bounding box and identify the object as a "Person." In another example, the object recognition and tracking module 212 can detect the presence of a box or crate and identify or classify the object as a "box". Object detection and classification produces an accurate assessment of the environment for use in motion planning for the AGV to produce improved trajectory prediction, movement efficiency, and collision avoidance. For example, it takes into account humans have a higher probability of moving in the immediate future compared to stationary boxes.

The object recognition and tracking module 212 generates the detected object data (e.g., object location data, classification data, etc.) and provides the detected object data to the moving object trajectory prediction module 213. In an embodiment, the moving object trajectory prediction module 213 tracks the human and predicts a trajectory of the human to assist the motion planner in proactively guiding the AGV's movement in the human-populated environment around people. Advantageously, the moving object trajectory prediction module 213 predicts a trajectory of a moving object in the surrounding environment of the AGV. In an embodiment, the moving object trajectory prediction module 213 generates predicted trajectory data corresponding to the detected object (e.g., the human) and provides the predicted trajectory data to a path and trajectory planning module 204.

In an embodiment, based on the environment information, the path and trajectory planning module 204 determines trajectory data for the AGV based at least in part on the predicted trajectory data corresponding to the detected moving object. In an embodiment, the trajectory data accounts for the predicted trajectory data associated with a detected dynamic object to adjust, update, or change the path and trajectory planning of the AGV to avoid collision with the moving object and ensure safe and efficient operation in a dynamic and busy environment. Advantageously, use of the predicted trajectory data by the path and trajectory planning module 204 to perform motion planning for the AGV produces a more predictable and natural human-robot interaction while still enabling efficient navigation in an environment having tight and dynamic constraints.

In an embodiment, the path and trajectory planning module 204 receives location data associated with the autonomous robotic vehicle from the localization and mapping module 211. In an embodiment, the autonomous robotic vehicle location data includes coordinates identifying a location of the autonomous robotic vehicle as determined by the localization and mapping module 211. In an embodiment, the path and trajectory planning module 204 uses both the autonomous robotic vehicle location data and the predicted trajectory data corresponding to the moving object to generate trajectory data for the autonomous robotic vehicle.

In an embodiment, the path and trajectory planning module 204 provides the trajectory data to the motion controller 206. In accordance with at least one embodiment, the motion controller 206 may be configured to generate drive data corresponding to a local travel plan or path for completing a task within the environment in view of the detected moving object. The local travel plan or path may include instructions for steering and a speed to utilize for one or more propulsion components of the drive system 215 of the automatic robotic vehicle. In embodiments, the motion controller 206 uses the trajectory data based on the autonomous robotic vehicle location data and the predicted trajectory data to generate the drive data corresponding to the updated or new travel plan that includes avoiding or navigating around the detected moving object that is within a local planning zone and a current travel plan associate with the AGV. The new travel plan may include the drive data including instructions to the drive system 215 for updating a steering, direction, and speed for the autonomous mobile robot to utilize while navigating the facility or workspace to complete a task. In some embodiments, the new travel plan may include instructions for centering the autonomous mobile robot between the identified physical dimensions surrounding the object and a wall or barrier of the facility or workspace. In accordance with at least one embodiment, the new travel plan may include instructions for centering the autonomous robotic vehicle between the identified object/obstacle in the local planning zone according to a distance of a safety zone around the autonomous robotic vehicle.

In accordance with at least one embodiment, the safety management controller 208 may be configured to generate and maintain a safety zone around the autonomous robotic vehicle using data captured by the sensor module 204. In embodiments, the sensor data may include data collected by one or more safety sensors configured to capture data up to a certain distance around the autonomous robotic vehicle that is less than the distance captured by one or more other sensors coupled to the sensor module 202. In accordance with at least one embodiment, the size of the safety zone may be less than that of the local planning zone generated by the motion controller 206. The safety management controller 208 may be configured to identify or detect an object or obstacle penetrating the safety zone based on the data captured by the safety sensors and provide a safety command (e.g., stop or run instructions) to the drive system 215. In an embodiment, the path and trajectory planning module 204 and the motion controller 206 provide safety state data to the safety management controller 208 for use with the sensor data to determine the safety command. For example, in an embodiment, the safety management controller 208 may maintain a safety zone defining a zone around the autonomous robotic vehicle. In an embodiment, the safety management controller 208 provides instructions to stop the autonomous robotic vehicle upon identifying an object or obstacle within the safety zone. In an embodiment, the size and shape of the safety zone is determined based at least in part on current speed of the autonomous robotic vehicle which in turn is determined by the motion controller 206.

In an embodiment, the safety management controller 208 may dynamically update the size of the safety zone based on the safety state data obtained from the motion controller 206 and path and trajectory planning module 204. In an embodiment, the motion controller 206 produces drive data to enable the autonomous robotic vehicle to travel, for example, a slower speed, past crowded, congested, or otherwise non-clear paths of the environment based on the trajectory data with a failsafe provided by the safety management controller 208 configured to override any propulsion or steering that results in the object or obstacle penetrating the safety zone. In an embodiment, the safety management controller 208 can respond to objects that move unexpectedly into the path of the autonomous robotic vehicle by detecting the object penetrating the safety zone and providing instructions to the drive system 215 to cease propulsion of the autonomous robotic vehicle. For example, a person opening a closed door and stepping directly into the path of the autonomous robotic vehicle from a blind spot.

Figure 3:
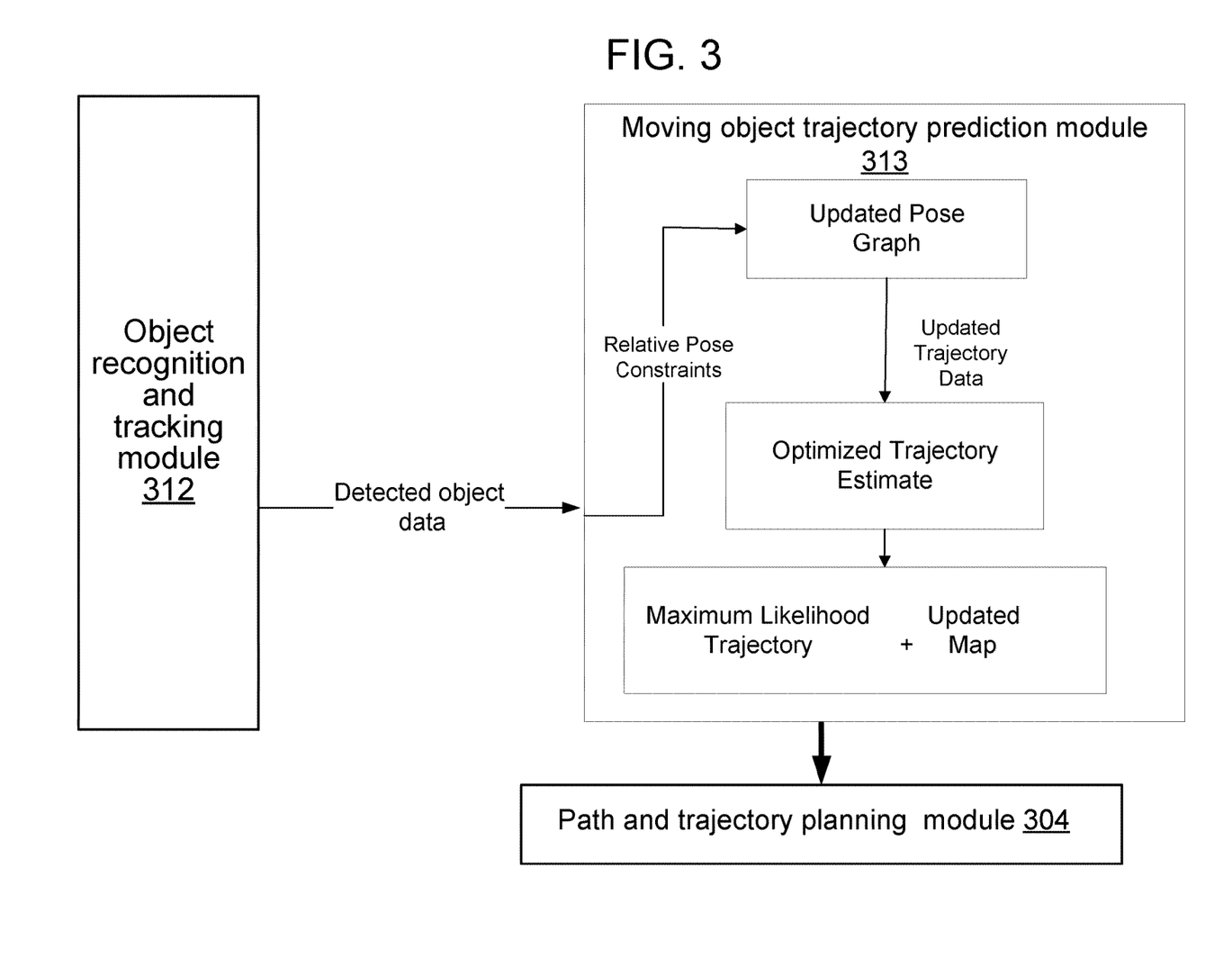
FIG. 3 is a diagram illustrating operations of a moving object trajectory prediction module of a vehicle management system, according to one embodiment.

FIG. 3 illustrates a block diagram corresponding to functions and operations performed by a moving object trajectory prediction module 313 of a vehicle management system of an autonomous robotic vehicle, according to embodiments. In an embodiment, the moving object trajectory prediction module 313 is configured to perform pedestrian estimation and prediction (PEAP) processing to generate predicted trajectory data corresponding to a moving object (e.g., a pedestrian) in an environment of the autonomous robotic vehicle. In an embodiment, the moving object trajectory prediction module 313 is configured to receive detected object data from an object recognition and tracking module 312, as shown in FIG. 3. For example, the detected object data can include information about a detected person generated based on clusters identified from one or more LIDAR scans.

In an embodiment, the moving object trajectory prediction module 313 generates one or more relative pose constraints corresponding to the detected object data. In an embodiment, the relative pose constraints represents a measurement of the object state received from the object recognition and tracking module 312. In an embodiment, the relative pose constraints are used to update a pose graph associated with the person. The pose graph is a sliding window represents a series of calculated trajectories of the person including a past trajectory from a first time (X) before a current time (e.g., a past or previous trajectory of the person) and a second (Y) after the current time (e.g., a predicted or future trajectory of the person).

In an embodiment, in response to receipt of a new measurement associated with the person (e.g., a measurement of the coordinates of the person, a speed of the person, an acceleration of the person, etc.), the sliding window is moved forward and each previously calculated trajectory (e.g., the trajectories of the first time (X) and the second time (Y)) are updated based on the new measurement. In an embodiment, in response to calculating the updated trajectories based on the new measurement, the oldest trajectory (e.g., the trajectory associated with the first time (x) can be discarded. Accordingly, in an embodiment, the moving object trajectory prediction module 313 updates the estimated past trajectory and the future predicted trajectory concurrently.

In an embodiment, in response to the calculation of the updated trajectory data, the moving object trajectory prediction module 313 generates a new or updated optimized trajectory estimate (e.g., the predicted trajectory data of FIG. 2) for a next time step. In an embodiment, the optimized trajectory estimate can include a maximum likelihood trajectory and updated map and can be published or provided to path and trajectory planning module 304 of the vehicle management system for further processing (e.g., for the calculation of trajectory data for the AGV in view of the predicted trajectory data corresponding to the detected person). In an embodiment, in the next time step, a new measurement is received and the above-described process is repeated to generate an updated optimized trajectory estimate corresponding to the person.

Figure 4:
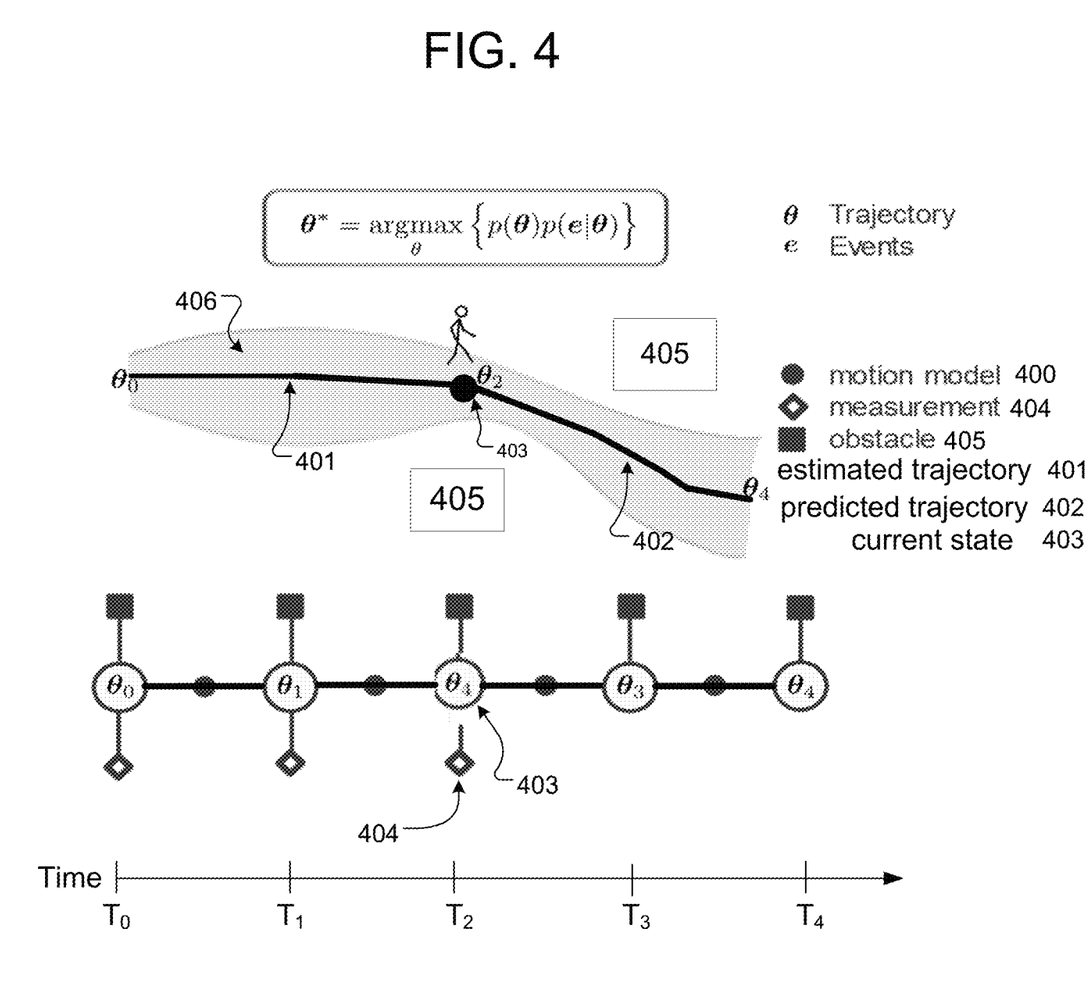
FIG. 4 is a diagram illustrating trajectory estimation and prediction processing corresponding to a moving human object in a dynamic environment, according to one embodiment.

FIG. 4 illustrates an example generation of predicted trajectory data corresponding to a moving object (e.g., a person) in accordance with the PEAP processing executed by a moving object trajectory prediction module (e.g., moving object trajectory prediction module 113, 213, 313 of FIGS. 1, 2, and 3, respectively). As illustrated in FIG. 4, a sequence of continuous time is divided into discrete elements (e.g., $T_0$, $T_1$, $T_2$, $T_3$, $T_4$) and a trajectory value ($\theta$) is calculated at each point in time.

In an embodiment, at each timestep, a probability distribution p(θ) is generated to represent an estimated trajectory 401 (e.g., a trajectory between time $T_0$ and the current time $T_2$) of the person. In an embodiment, the probability distribution is constrained by taking into account the probability of the person having the estimated trajectory 401 in view of a received measurement 404 and other environmental factors. Example measurements 404 can include a position of the person (e.g., the X, Y coordinates), a speed of the person, an acceleration of the person, a velocity of the person, etc.) As illustrated in FIG. 4, the moving object trajectory prediction module uses motion model 400 to determine a trajectory $\theta_2$ at time $T_2$ based on events (e), wherein the events (e) can include a measurement 404, an obstacle 405, etc. In an embodiment, the trajectory θ can be determined for each of the discrete time elements in view of the events to generate an estimated trajectory 401 associated with past motion of the person (e.g., before the current time $T_2$) and future motion of the person (e.g., after the current time $T_2$). In an embodiment, a covariance or uncertainty associated with a trajectory of the person is represented by the shaded portion 406 in FIG. 4.

In an embodiment, the constrained probability distribution can be formulated as a Bayesian inference problem according to the following expression:

$$p(\theta \mid e) \propto p(\theta) p(e \mid \theta)$$

where θ is the trajectory and e is an event (e.g., a measurement 404, an obstacle 405, etc.)

In an embodiment, given that the posterior probability p(θ|e) is a probability distribution, the following function can be used to determine a most likely or predicted trajectory (θ*) 402:

$$\theta^* = \underset{\theta}{\mathrm{argmax}}\{p(\theta)p(e \mid \theta)\}$$

In an embodiment, a maximum of a posterior probability peak can be determined using the following expressions:

$$p(e \mid \theta) = f^{meas} f^{obs}$$
$$f^{obs} = f^{static} f^{dynamic}$$
$$f_i^{static} = f_i^{dynamic} = \exp\left\{-\frac{1}{2}\|h(\theta_i)\|_{\Sigma_{obs}}^2\right\}$$

In an embodiment, one or more environmental factors (e.g., an event associated with a static object or dynamic object in the environment of the AGV) can be represented via the above Gaussian distributions. In an embodiment, the PEAP processing is configured to account for a variety of environmental factors by representing them entirely as Gaussian distributions of the likelihood function. An example environmental factor can include, a person walking down the street is likely going to avoid objects and obstacles like trees and other people by going around them. This avoidance behavior acts as a constraint on the person's possible trajectories (e.g., estimated and predicted trajectories), since a trajectory that causes the person to crash into a tree or come really close to it is highly unlikely. In an embodiment, the behavior in view of the identified environmental factors can be represented as a Gaussian probability distribution that becomes part of p(e|θ).

In an embodiment, the PEAP processing executed by the moving object trajectory prediction module determines the local past trajectory estimation 401 and the future trajectory prediction 402 concurrently. In an embodiment, the PEAP processing executed by the moving object trajectory prediction module formulates the estimated trajectory 401 and predicted trajectory 402 as a Bayesian inference problem. In an embodiment, the PEAP processing executed by the moving object trajectory prediction module, employs Gaussian factors for static, dynamic and other obstacles 405, which influence the likely or predicted trajectory 402 of the dynamic object (e.g., the person in FIG. 4). Advantageously, the PEAP processing executed by the moving object trajectory prediction module provides flexibility for influencing the dynamic object behavior based any number of environmental factors (e.g., events including measurements, obstacles, etc.) by presenting the environmental factors in a Gaussian distribution, as described above.

Figure 5:
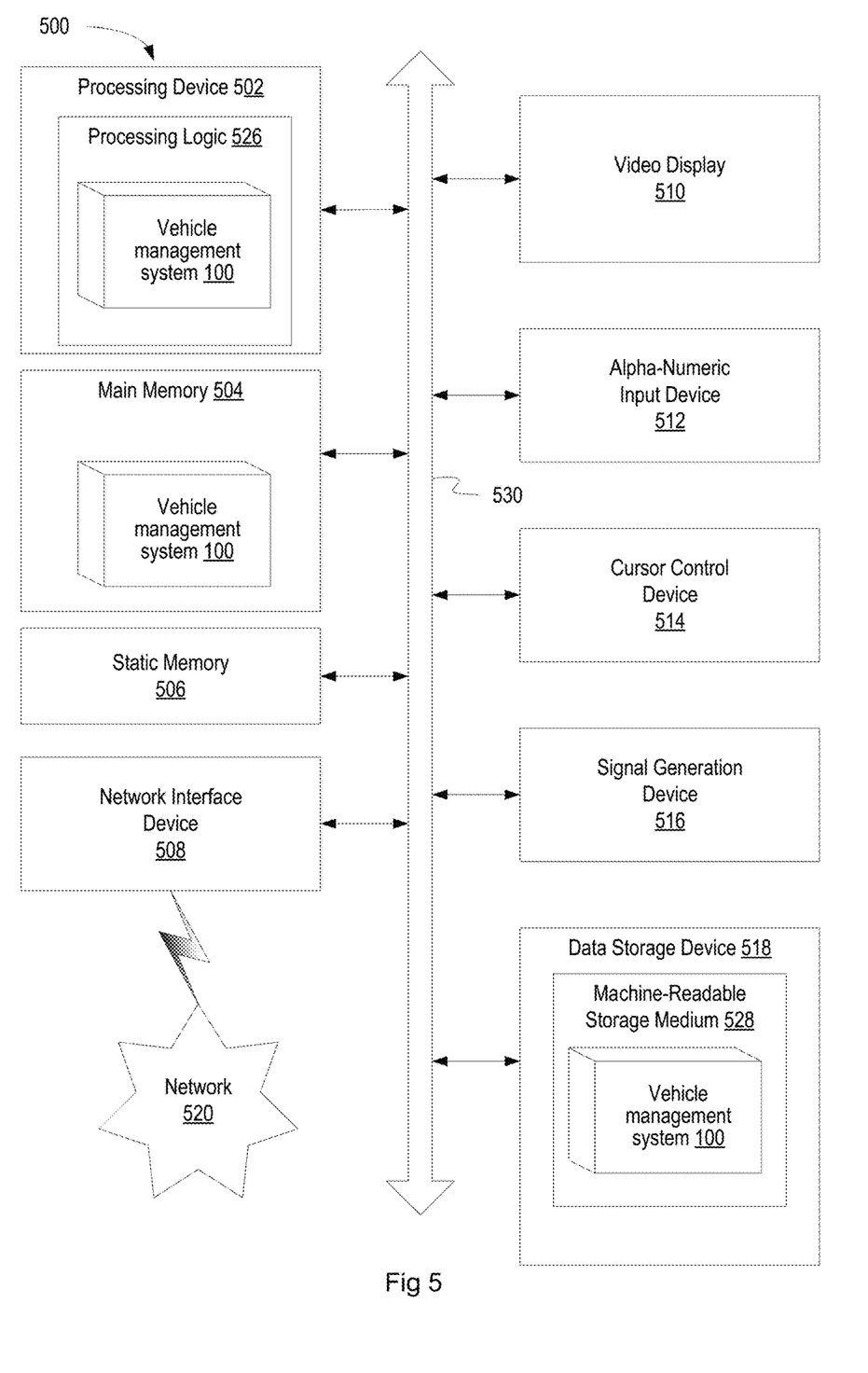
FIG. 5 illustrates a diagrammatic representation of a machine in the example form of a computer system including a set of instructions executable by a computer to deliver a product to a customer by autonomous delivery robot system according to any one or more of the methodologies discussed herein.

FIG. 5 illustrates a diagrammatic representation of a machine in the example form of a computer system 500 including a set of instructions executable by a computer to deliver a product to a customer by autonomous delivery robot system according to any one or more of the methodologies discussed herein. In one embodiment, the computer may include instructions to enable execution of the processes and corresponding components shown and described in connection with FIGS. 1-4.

In alternative embodiments, the machine may be connected (e.g., networked) to other machines in a LAN, an intranet, an extranet, or the Internet. The machine may operate in the capacity of a server machine in a client-server network environment. The machine may be a personal computer (PC), a set-top box (STB), a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein The example computer system 500 includes a processing device (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 518, which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. In various implementations of the present disclosure, the processing device 502 is configured to execute instructions for the vehicle management system 100 for performing the operations and processes described herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable storage medium 528 (or machine-readable medium) on which is stored one or more sets of instructions of the vehicle management system 100 embodying any one or more of the methodologies or functions described herein. The instructions may also reside, completely or at least partially, within the main memory 504 and/or within processing logic 526 of the processing device 502 during execution thereof by the computer system 500, the main memory 504 and the processing device 502 also constituting computer-readable media.

The instructions may further be transmitted or received over a network 520 via the network interface device 508. While the computer-readable storage medium 528 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely presented as examples. Particular implementations may vary from these example details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "performing", "applying", "determining", "generating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present disclosure as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   detecting, by a processing device of an autonomous robotic vehicle operating in an environment, object data corresponding to an object in motion at a current time in the environment, wherein the object data comprises at least one of a set of coordinates corresponding to the object, a speed corresponding to the object, an acceleration corresponding to the object, or a velocity corresponding to the object;
   generating, in view of the object data, a graph comprising a set of trajectory values corresponding to the object, the set of trajectory values comprising:

a previous trajectory estimate corresponding to the object at a first time prior to the current time; and
a predicted trajectory estimate corresponding to the object at a second time after the current time;
calculating trajectory data for the autonomous robotic vehicle in view of the previous trajectory estimate and the predicted trajectory estimate corresponding to the object;
converting, by a motion controller of the autonomous robotic vehicle, the trajectory data into one or more first drive instructions corresponding to a travel plan of the autonomous robotic vehicle to navigate within the environment to complete a task in view of the graph comprising the set of trajectory values corresponding to the object in motion;
controlling, by a drive system of the autonomous robotic vehicle, operation of the autonomous robotic vehicle in accordance with the one or more first drive instructions to establish the travel plan of the autonomous robotic vehicle in the environment in view of the graph comprising the set of trajectory values corresponding to the object in motion;
detecting updated object data corresponding to the object at an updated current time, wherein the updated object data is detected in view of an environmental event comprising at least one of detection of new measurement corresponding to the object by one or more sensors of the autonomous robotic vehicle or detection of an obstacle within the environment;
generating, in view of the updated object data, an updated graph comprising an updated set of trajectories values of the object, the updated set of trajectory values comprising:
an updated previous trajectory estimate corresponding to the object at a first time prior to the updated current time; and
an updated predicted trajectory estimate corresponding to the object at a second time after the updated current time;
calculating updated trajectory data for the autonomous robotic vehicle in view of the updated previous trajectory estimate and the updated predicted trajectory estimate corresponding to the object;
converting, by the motion controller of the autonomous robotic vehicle, the updated trajectory data into one or more second drive instructions corresponding to an updated travel plan of the autonomous robotic vehicle to navigate within the environment to complete the task in view of the updated graph comprising the updated set of trajectory values corresponding to the object in motion;
controlling, by the drive system of the autonomous robotic vehicle, operation of the autonomous robotic vehicle in accordance with the one or more second drive instructions to establish the updated travel plan of the autonomous robotic vehicle in the environment in view of the updated graph comprising the updated set of trajectory values corresponding to the object in motion;
establishing a zone relative to the autonomous robotic vehicle based on a current location of the autonomous robotic vehicle, wherein a size of the zone is updated based at least in part on the updated trajectory data that is based on the updated graph comprising the updated set of trajectory values corresponding to the object in motion;
determining that the object is located within the zone;

generating a safety command to terminate movement of the autonomous robotic vehicle; and
controlling, by the drive system of the autonomous robotic vehicle, operation of the autonomous robotic vehicle in accordance with the safety command to terminate movement of the autonomous robotic vehicle.

2. The method of claim 1, wherein generating the predicted trajectory estimate corresponding to the object comprises representing the environmental event as a Gaussian probability distribution.

3. The method of claim 1, further comprising identifying location data associated with the autonomous robotic vehicle, wherein the trajectory data is calculated in view of the location data.

4. The method of claim 1, wherein the updated travel plan is constrained to avoid a collision with the object in motion in the environment and to complete the task.

5. A method comprising:
detecting, by a processing device of a vehicle operating in an environment, object data corresponding to an object in motion in the environment;
generating, in view of the object data, a graph comprising a set of trajectory values corresponding to the object, the set of trajectory values comprising:
a previous trajectory estimate corresponding to the object at a first time prior to a current time; and
a predicted trajectory estimate corresponding to the object at a second time after the current time;
calculating trajectory data for the vehicle in view of the previous trajectory estimate and the predicted trajectory estimate corresponding to the object, wherein the trajectory data establishes a travel plan of the vehicle to navigate within the environment to complete a task in view of the object in motion;
controlling operation of the vehicle in accordance with the trajectory data;
establishing a zone relative to the vehicle based on a current location of the vehicle, wherein a size of the zone is updated based at least in part on the trajectory data that is based on the graph comprising the set of trajectory values corresponding to the object in motion;
determining that the object is located within the zone; and
terminating movement of the vehicle.

6. The method of claim 5, further comprising:
detecting updated object data corresponding to the object;
generating, in view of the updated object data, an updated graph comprising an updated set of trajectories values of the object, the updated set of trajectory values comprising:
an updated previous trajectory estimate corresponding to the object at a first time prior to an updated current time; and
an updated predicted trajectory estimate corresponding to the object at a second time after the updated current time;
calculating updated trajectory data for the vehicle in view of the updated predicted trajectory estimate corresponding to the object; and
controlling operation of the vehicle in accordance with the updated trajectory data.

7. The method of claim 5, wherein the object data comprises at least one of a set of coordinates corresponding to the object, a speed corresponding to the object, an acceleration corresponding to the object, or a velocity corresponding to the object.

8. The method of claim 5, wherein the trajectory data comprises a map corresponding to the environment.

9. The method of claim 5, further comprising identifying location data associated with the vehicle, wherein the trajectory data is calculated in view of the location data.

10. The method of claim 5, further comprising identifying an environmental event comprises at least one of a measurement of the object data or detection of an obstacle in the environment.

11. The method of claim 10, further comprising representing the environmental event as a Gaussian distribution used to generate the predicted trajectory estimate corresponding to the object.

12. A vehicle comprising:
one or more sensors detecting object data corresponding to an object at a first time;
a processing device operatively coupled to the one or more sensors, the processing device to execute instructions to perform operations comprising:
generating, in view of the object data, a predicted trajectory estimate corresponding to the object at a second time after the first time; and
calculating trajectory data for the vehicle in view of the predicted trajectory estimate corresponding to the object, wherein the trajectory data establishes a travel plan of the vehicle to navigate within an environment to complete a task in view of the object in motion; and
a drive system operatively coupled to the processing device, wherein the drive system:
controls operation of the vehicle in accordance with the trajectory data; and
terminates movement of the vehicle in response to a command indicating the object is located within a zone established relative to the vehicle, wherein a size of the zone is updated based at least in part on the trajectory data that is based on a graph comprising a set of trajectory values corresponding to the object in motion.

13. The vehicle of claim 12, the one or more sensors further detecting updated object data corresponding to the object.

14. The vehicle of claim 13, the processing device to execute the instructions to perform further operations comprising:
generating, in view of the updated object data, an updated pose graph comprising an updated set of trajectories values of the object, the updated set of trajectory values comprising:
an updated previous trajectory estimate corresponding to the object at a first time prior to an updated current time; and
a predicted trajectory estimate corresponding to the object at a second time after the updated current time; and
calculating updated trajectory data for the vehicle in view of an updated predicted trajectory estimate corresponding to the object.

15. The vehicle of claim 14, wherein the drive system controls the operation of the vehicle in accordance with the updated trajectory data.

16. The vehicle of claim 12, wherein the object data comprises at least one of a set of coordinates corresponding to the object, a speed corresponding to the object, an acceleration corresponding to the object, or a velocity corresponding to the object.

17. The vehicle of claim 12, wherein the trajectory estimate comprises a map corresponding to an environment comprising the vehicle.

18. The vehicle of claim 12, the processing device to execute the instructions to perform further operations comprising identifying location data associated with the vehicle, wherein the trajectory data is calculated in view of the location data.

19. The vehicle of claim 12, the processing device to execute the instructions to perform further operations comprising identifying an environment event comprises at least one of a measurement of the object data or detection of an obstacle in the environment.

20. The vehicle of claim 12, the processing device to execute the instructions to represent an environmental event as a Gaussian distribution used to generate the predicted trajectory estimate corresponding to the object.

* * * * *